Feb. 28, 1956      J. MARTIN      2,736,236
APPARATUS FOR EJECTING SEATS FROM AIRCRAFT
Filed Aug. 23, 1952      2 Sheets-Sheet 1
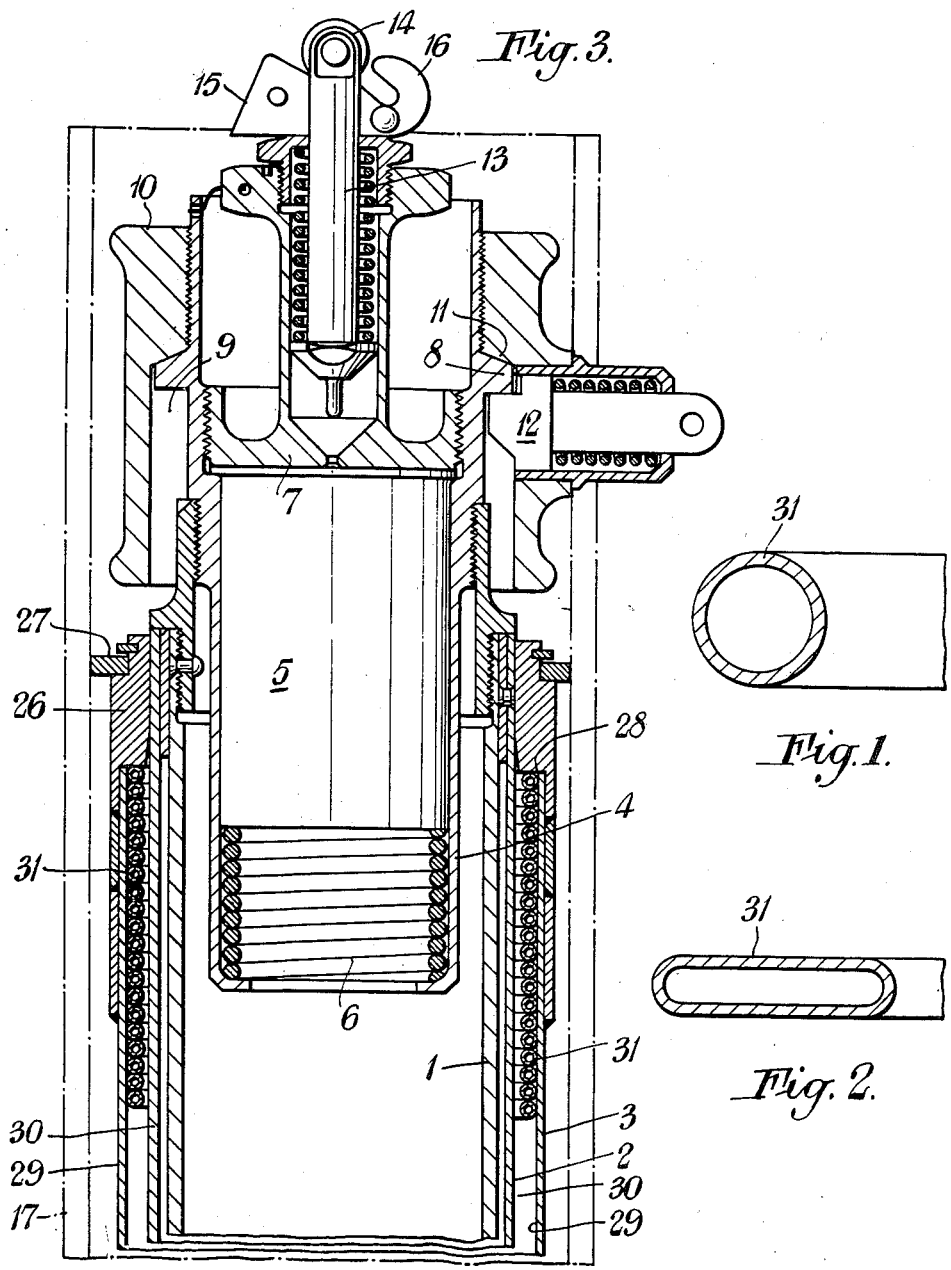
Inventor.
JAMES MARTIN
per Worth Wade
Attorney.

Feb. 28, 1956  J. MARTIN  2,736,236
APPARATUS FOR EJECTING SEATS FROM AIRCRAFT
Filed Aug. 23, 1952  2 Sheets-Sheet 2
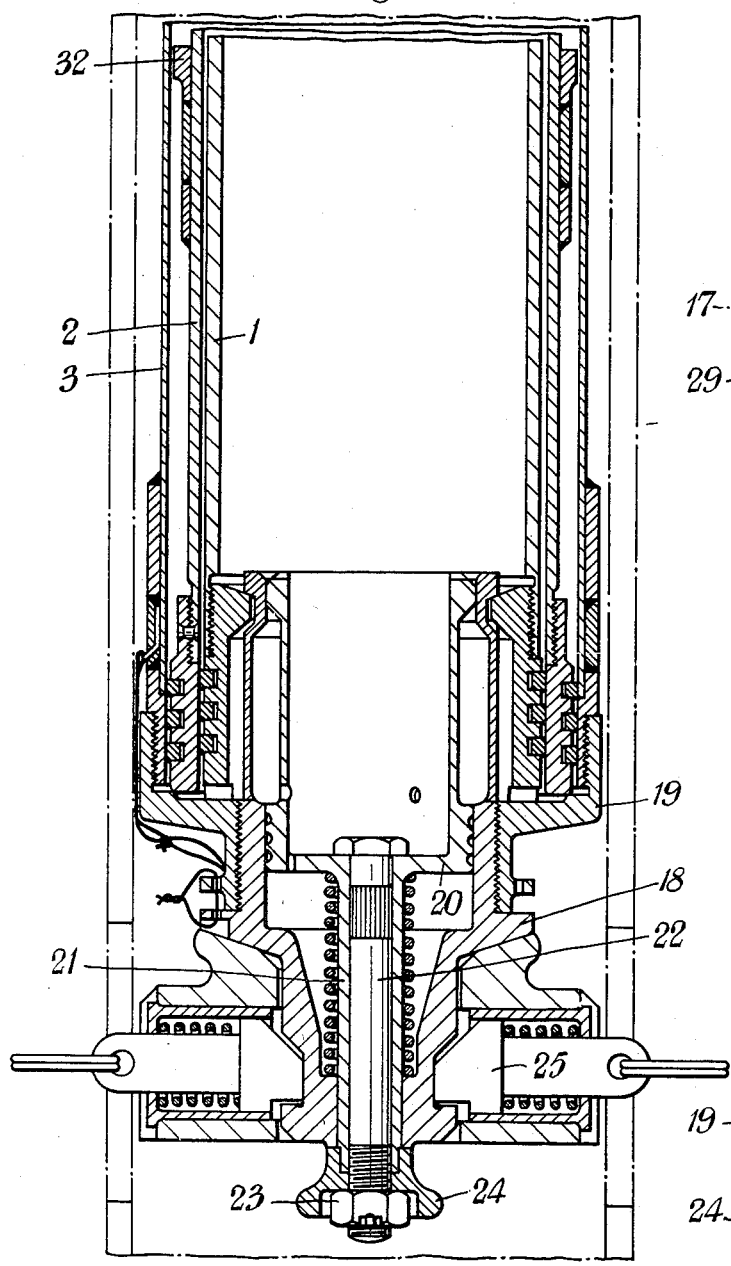
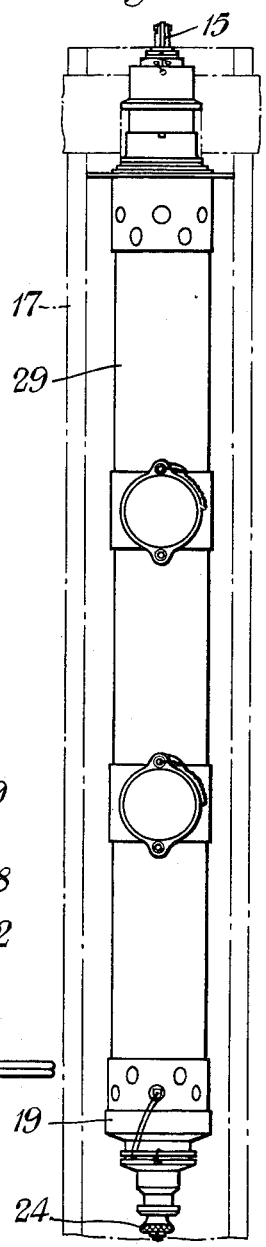
Inventor
JAMES MARTIN
per Worth Wade
Attorney.

United States Patent Office 2,736,236
Patented Feb. 28, 1956

2,736,236

APPARATUS FOR EJECTING SEATS FROM AIRCRAFT

James Martin, Higher Denham, near Uxbridge, England

Application August 23, 1952, Serial No. 305,952

2 Claims. (Cl. 89—1)

The present invention relates to ejection guns or impeller unit as used in apparatus for ejecting seats from aircraft.

Examples of ejection seats are those described in the specifications of my patents numbered 2,467,763; 2,502,470; 2,527,020; and 2,569,638.

In the case of a telescopic gun or impeller gun or impeller unit as used in ejection seats it is sometimes necessary, in order to increase the stroke without increasing the closed length of the gun or impeller unit to employ a number of telescoping parts or piston tubes.

Owing to the very high speed at which these guns operate, the intermediate piston or pistons cannot be allowed to strike a solid stop, but its or their kinetic energy must be taken up or damped by a shock absorber or shock absorbers so as to reduce the impact when it or they is or are brought to rest.

By the present invention there is provided an improved construction of shock absorber for use with a telescopic gun or impeller unit of an injection seat which shock absorber can be readily manufactured, is efficient in use and can be easily applied in the assembling of the gun parts.

The invention is characterized in that a telescopic gun or impeller unit has incorporated therewith a shock absorber consisting of a number or stack of independent metal hollow rings, against which a moving component or part of the gun, towards the end of its stroke, contacts and permanently distorts the walls of said rings. After impact of the moving part with the stack of independent hollow metal rings the walls of the hollow rings will be distorted. The kinetic energy of the moving part will thus be absorbed or damped out, partly by deformation of the walls of the rings and partly by compression of the air enclosed within the rings, the amount of deformation being such that the internal air space in each ring is reduced so that the volume of air therein, which cannot escape, is compressed.

It is to be understood that a number of moving parts arranged to telescope one within the other may be used with shock absorbers placed therebetween.

These hollow rings are formed of metal tubing bent into a circular shape and the ends welded to form a continuous hollow ring.

The accompanying drawing illustrates an example of carrying into effect the invention.

In the drawings:

Figure 1 shows the shock absorber in its normal form before deformation.

Figure 2 the same after deformation.

Figures 3 and 3A show a section view of a telescopic ejection gun having one intermediate telescopic part, i. e. a piston, with the shock absorbing means incorporated therewith, and Figure 4 is a plan view of the gun.

The ejection gun illustrated comprises an inner piston or part 1 and an intermediate piston or part 2 both working in a cylinder 3. In the upper end of the piston 1 is secured a union body 4 in which is a chamber for a primary cartridge 5 and a cartridge ejection spring 6. The cartridge is held in position by a breech block 7. The union body has a flange 8 which engages in an opening 9 in a cross beam 10 of the ejector seat frame and against a seating 11 where it is retained by a spring pressed lock 12.

In the breech block 7 is fitted a spring loaded firing pin 13 forked at its upper end and fitted with a roller 14. In the forked end of the firing pin 13 is a removable wedge shaped sear 15 having a hook 16 with which is connected a flexible cable actuated by the airman for firing the gun.

The dotted outline 17 indicates a fixed guide on the aeroplane on which the ejector seat is slidably mounted.

The cylinder 3 is closed at its lower end by a head 18 and end cap 19. Within the head 18 is a locking piston 20 attached to the inner piston 1. In an extension 21 of said locking piston is a bolt 22 on which is a slotted bolt 23 retaining a manually released button 24. The cylinder 3 is held against displacement by a spring pressed locking catch 25.

The upper end of the cylinder 3 projects into a sleeve member 26 having a centering ring 27. This member 26 has an internal shoulder 28. Housed between the inner wall 29 of the cylinder 3 and the external wall 30 of the intermediate piston 2 is a stack of independent hollow metal rings 31. One end of the stack rests against the shoulder 28. On the intermediate piston 2 is a sleeve 32, which towards the end of the movement of the said intermediate piston comes against the stack of hollow rings 31 and crushes them up against the shoulder 28, thereby taking up or damping the kinetic energy of the intermediate piston, the rings being permanently distorted from their normal form shown in Figure 1 to that shown in Figure 2.

In practice in the example shown in Figures 3–3A the inner piston 1 and the intermediate piston 2 would extend as one unit to the limit of the stroke of the intermediate piston 2. The inner piston 1 would now continue its stroke sliding in the intermediate piston 2 and leaving this in due course.

It will be apparent that the invention can be variously modified and changed within the scope of the appended claims.

I claim:

1. A telescopic ejection gun for an ejection seat of an aircraft comprising a fixed cylinder, closure means at the lower end thereof, a sleeve member into which the upper end of said cylinder projects, an internal shoulder on the sleeve member, an inner piston and an intermediate piston moving in said cylinder, a cartridge chamber and firing means at the upper end of said inner piston, a shock absorber consisting of a stack of independent hollow metal rings interposed between the cylinder and the intermediate piston, one end of the stack resting against the internal shoulder and a sleeve on the intermediate piston which towards the end of the stroke of said piston contacts the other end of the stack of hollow metal rings and crushes these against the internal shoulder whereby the kinetic energy of the intermediate piston is absorbed or damped out partly by permanent deformation of the walls of the metal rings and partly by compression of the air enclosed within the rings.

2. A telescopic ejection gun for an ejection seat of an aircraft comprising a fixed cylinder, a head and end cap for closing the lower end thereof, a sleeve member into which the upper end of said cylinder projects, an internal shoulder on the sleeve member, an inner piston, means for temporarily locking said piston to the head of the fixed cylinder, a second piston intermediate of said fixed cylinder and the inner piston, a cartridge chamber and firing means at the upper end of said inner piston, a shock absorber consisting of a stack of independent hollow metal rings interposed between the cylinder and the intermediate piston, one end of the stack resting against the internal shoulder, and means on the intermediate piston which towards the end of the stroke of said piston contacts the other end of the stack of hollow rings and crushes these against the said internal shoulder whereby the kinetic energy of the intermediate piston is absorbed or damped out partly by permanent deformation of the walls of the metal rings and partly by compression of the air enclosed within the rings.

References Cited in the file of this patent

UNITED STATES PATENTS

| | | |
|---|---|---|
| 1,416,828 | Holmes | May 23, 1922 |
| 2,516,902 | Musser | Aug. 1, 1950 |
| 2,541,087 | Musser | Feb. 13, 1951 |
| 2,579,683 | Lobelle | Dec. 25, 1951 |

FOREIGN PATENTS

| | | |
|---|---|---|
| 9,216 | Great Britain | 1897 |
| 169,919 | Switzerland | June 15, 1934 |

OTHER REFERENCES

Abstract of Lucht application Serial Number 708,370, published September 6, 1949, volume 626, page 286, O. G., September 6, 1949.